(12) United States Patent
Neshatfar et al.

(10) Patent No.: US 6,490,581 B1
(45) Date of Patent: Dec. 3, 2002

(54) SYSTEM AND METHOD FOR PROVIDING AN OBJECT-ORIENTED INTERFACE TO A RELATIONAL DATABASE

(75) Inventors: Shapour Neshatfar, Manalapan, NJ (US); Pramod Warty, Freehold, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/577,103

(22) Filed: May 24, 2000

(51) Int. Cl.[7] .............................................. G06F 17/30
(52) U.S. Cl. ...................... 707/4; 707/103 R
(58) Field of Search .............. 707/2, 3, 4, 10, 707/103 R, 103 Z (56) References Cited

U.S. PATENT DOCUMENTS

| | | | | |
|---|---|---|---|---|
| 5,586,311 A | * | 12/1996 | Davies et al. ................ | 345/764 |
| 5,627,979 A | * | 5/1997 | Chang et al. ................ | 345/763 |
| 5,809,266 A | * | 9/1998 | Touma et al. ................ | 345/764 |
| 6,016,488 A | * | 1/2000 | Bosworth et al. ............ | 707/4 |
| 6,122,641 A | * | 9/2000 | Williamson et al. .......... | 707/101 |
| 6,269,475 B1 | * | 7/2001 | Farrell et al. ................ | 717/113 |

OTHER PUBLICATIONS

Keramopoulos et al, "The Users View Level of the GOQL Graphical Query Language" Jul. 1999, Proceedings 1999 IEEE International Conference on Information Visualization, pp. 82–86.* de Carvalho et al, "A Visual Query System Implementing a Temporal Object–Oriented Model with Roles on a Relational Database" Nov. 1997, Proceedings XVII Inernational Confernce of the Chilean Computer Science Society, pp. 38–40.*

Epstein, "A Graphical Query Langueage for Object–Oriented Data Models," Oct. 1990, Proceedings of the 1990 IEEE Workshop on Visual Languages, pp. 36–41.*

* cited by examiner

*Primary Examiner*—Jack Choules (57) ABSTRACT

A method provides for an easily understood representation of the elements and relationships captured in a relational database. In accordance with the method an object model specification file and a database schema file are parsed to create a user-friendly graphical representation of object models and their relationship. The user is able perform a query by selecting one or more objects and setting constraints using the graphical representation of object models.

6 Claims, 9 Drawing Sheets

| Query Results |
|---|

CFamily

| children | pet | | |
|---|---|---|---|

CFamily

| m_Familyrnid | 1.0 | | |
|---|---|---|---|
| m_phoneNumber | (939)989-0001 | | |
| m_address | Family_Address1 | | |
| m_state | FL | | |

| mother | | father | |
|---|---|---|---|
| m_firstName | Janet | m_firstName | Robert |
| m_lastName | Leveriling | m_lastName | Leveriling |
| m_sex | F | m_sex | M |
| m_birthday | 1929-08-19 00:00:00 | m_birthday | 1919-02-27 00:00:00 |
| m_ss | 860-06-0002 | m_ss | 054-39-0010 |
| m_personitrnid | 2.0 | m_personitrnid | 10.0 |
| m_weight | 58.0 | m_weight | 102.0 |
| m_height | 9.98 | m_height | 4.49 |
| m_animalType | AnimalType3 | m_animalType | AnimalType2 |
| m_food | Food3 | m_food | Food2 |
| m_animalitrnid | 3.0 | m_animalitrnid | 2.0 |
| m_area | Area3 | m_area | Area2 |
| m_temerature | Cool | m_temerature | Warm |
| m_climate | Cool | m_climate | Normal |
| m_geoType | Mountain | m_geoType | Plain |

[Next Record]

```
Class: CAnimal {
  Table: animal {
    m_weight = weight;
    m_height = height;
    m_animalType = animaltype;
    m_food = food;
    m_animalItrnId = animalitrnid;
  }
}
```

FIG. 10

```
Class: CFamily {
  Table: family {
    m_familyItrnid = familyitrnid;
    m_phoneNumber = phonenumber;
    m_address = address;
  }

PartOf: father = CPerson {
    FK: family.fatheritrnid = person.personitrnid;
  }

PartOf: mother = CPerson {
    FK: family.motheritrnid = person.personitrnid;
  }

PartOf: children[] = CPerson {
    Table: children;
    FK: children.familyitrnid = family.familyitrnid;
    FK: children.personitrnid = person.personitrnid;
  }

PartOf: pet[] = CFamilyPet {
    Table: familypet;
    FK: familypet.familyitrnid = family.familyitrnid;
  }
```

SYSTEM AND METHOD FOR PROVIDING AN OBJECT-ORIENTED INTERFACE TO A RELATIONAL DATABASE

FIELD OF THE INVENTION

The field of the invention is databases, and in particular providing an object-oriented graphical user interface through which a relational database can be manipulated.

BACKGROUND OF THE INVENTION

Known graphical user interfaces to Relational Database Management Systems ("RDBMS") can list of all the tables in the database. A "table," which is also called a "relation," is a collection of stored records. Each record consists of one or more fields or attributes. A table is referred to with a name (table name), and each attribute (field) in a table has a name and a type. For example, a collection of records that each stores an employee identifier, an employee name and an employee age can form a table. In this example, the table is called the EMPLOYEE table. The attribute names are "employee identifier," "employee name," and "employee age". The attribute type identifies the type data that the attribute can hold (e.g. INTEGER, CHARACTER). The actual data stored in a field (e.g., John Smith or Maria Williams stored in an "employee name" attribute) is called a "attribute value" which is also known as "data." A record is a correlated set of stored fields. For example, a stored employee identifier correlated with a stored employee name and a stored employee age is a "record."

With RDBMS's graphical user interface, the attributes within each table are presented to the user, and the user can manipulate (e.g., access, modify, delete) the data in the database by entering one or more commands. A command or group of commands used to manipulate data is referred to as a query. The query can concern a single table or multiple tables. One of the most popular languages for making queries is "Structured Query Language" ("SQL"). An example of a SQL query given the above described table is:

SELECT Employee_Identifier, Employee_Name FROM EMPLOYEE WHERE Employee_Identifier>1000

The above query will return a set of records including employee identifiers greater than 1000 and employee names associated with those identifiers. Information about an application is stored in a number of tables in a given database. There are guidelines to follow for distributing the information among many tables. Usually, the pieces of data that are closely related (one to one relationship, such as first name, last name, sex, social security number, and birthday) go together in a table. The database schema is a list of all the tables and their attributes.

To retrieve information which are scattered among multiple tables, an operation known as JOIN has to be performed. The JOIN operation joins together two tables on the basis of common values in a common attribute. For example, suppose the above described Employee table contains, "Employee identifier", "Employee name", and "Employee age" and that a LOCATION table includes the attributes "primary employee office location," "secondary employee office location," "employee telephone extension," and "employee identifier". The EMPLOYEE table can be JOINed with the LOCATION table on the shared attribute ("key") "Employee identifier" to relate an employee with his/her locations. The JOIN operation results in the attributes "employee identifier", "employee name", "employee age", "primary employee office location", "secondary employee office location", and "employee telephone extension". The "employee identifier" is a primary key in table EMPLOYEE, in that "employee identifier" uniquely identifies a row of attributes in the EMPLOYEE table. The "employee identifier" is a foreign key in table LOCATION, in that it references the primary key in EMPLOYEE. Getting other information about an employee from the various tables in the RDB is a non-trivial exercise requiring the execution of many-way JOINs (JOINing multiple tables).

When a user wants to perform a multiple table query, a user often needs to have an intimate knowledge of both the database schema and a query language, e.g., SQL. Database schema can be complex. For example, in addition to the EMPLOYEE table and the LOCATION table described above, the database may include additional tables holding information about salary, employment status, employee's education, and employee's performance records. To perform a query, one has to know exactly how the information in one table is related to another table and what are the primary and foreign keys. Furthermore, SQL can require a substantial amount of time and effort to master. In most known systems, a user is disadvantageously required to be well acquainted with the schema of the database and the SQL language to perform even a simple query, such as determining the locations of a subset of employees. More complex operations on the database require even higher levels of knowledge and skill with SQL. This disadvantageously reduces the usefulness of a database to potential users who have neither the time nor the inclination to learn the schema and/or SQL.

In one paradigm, an entity that manipulates data is represented as an abstraction called an "object." This object-oriented paradigm is described in James Rumbaugh, *Object-Oriented Modeling and Design*, Prentice Hall, 1991. An object includes a description of a structure of data, ways in which the object manipulates data, and the object's relationship with other objects. A tool (called "OSP") for mapping an object model to a relational database schema is described in co-pending U.S. application Ser. No. 09/312,798, "System and Method for Mapping a Relational Database to an Object-Oriented Paradigm", filed May 17, 1999. OSP enables an application developer to view a relational database in terms of objects, and permits the developer to manipulate the data in the database using object-oriented programming languages, such as C++. While OSP facilitates database manipulation for computer programming experts, it can be difficult to use for users who are not expert programmers, or else not programmers at all. Thus, the OSP tool alone does not address the issue of facilitating searches of relational databases by those less savvy in programming.

SUMMARY OF THE INVENTION

An embodiment of the present invention provides a graphical, object-oriented view of information stored in a relational database. An embodiment of the present invention can advantageously be published on the World Wide Web on the Internet and/or an Intranet. Users with no knowledge of a database query language or the layout of the data in the database can advantageously perform sophisticated queries with just a few mouse clicks, in accordance with an embodiment of the present invention.

In accordance with an embodiment of the present invention, an object model is mapped to a database schema, e.g., using a graphical user interface or a text editor. Mapping an object model onto a database schema means representing the relationship among the tables in the database in terms of objects. In turn the present invention provides a user friendly representation of the object model. For example, the present invention can present the object model on a web site. The web site can advantageously be deployed on the Internet, an Intranet, or even be represented only locally on a user's computer. Having the information graphically represented as objects advantageously obviates the need to know the database schema for performing any query. An embodiment of the present invention advantageously hides the complexity of the database schema using the object model, and transparently to the user works out the details of the mapping between the object model and the database schema. In this way, a user is advantageously provided with an intuitive and easy to understand representation of the data in the database.

In an object model in accordance with an embodiment of the present invention, an object may have various traits or characteristics. For example, an object may be capable of inheriting a property from another object. For example, given the class human every object in the class can be said to inherit the properties of another class, mammal. (That is, every human is a mammal.) Additionally, an object can be made of an aggregation of other objects. For example, given the object automobile, that object can be comprised of multiple objects such as the body and engine objects. An object can also contain a collection of other objects. For example, a family object can contain a collection of children objects that is the object. An object can also be associated with another object or objects. For example, a person object may be associated with another person object through an association link such as spouse which defines a marriage tie between two persons.

Furthermore, in accordance with the present invention a user can easily perform a query on one or more objects by setting a constraint on one or more objects, and interconnecting member variables of two or more objects. The result of the query is represented in a format that is consistent with the structure of the object model.

DETAILED DESCRIPTION

Overview

The present invention provides a more user friendly representation of database information which facilitates user queries. In accordance with an embodiment of the present invention database schema information is mapped into the object-model paradigm using a tool described in the above-referenced patent application, the description of the tool being incorporated herein by reference. The results of that mapping operation are accessible from a web site using a browser such at Netscape Navigator or Microsoft's Internet Explorer. The browser presents the object model information in an easy-to-view format that also shows the basic relationships between the various objects. The user can select one or more objects from the display and define a search in terms of setting one or more constraints on the one or more object(s). The query is then launched without the user having to understand the complex relationships that underlie these objects.

The following sections of this description set forth details of the architecture and design described in the context of an example. In that example, the precepts of the present invention are applied to a relational database related to "families".

Figure 1:
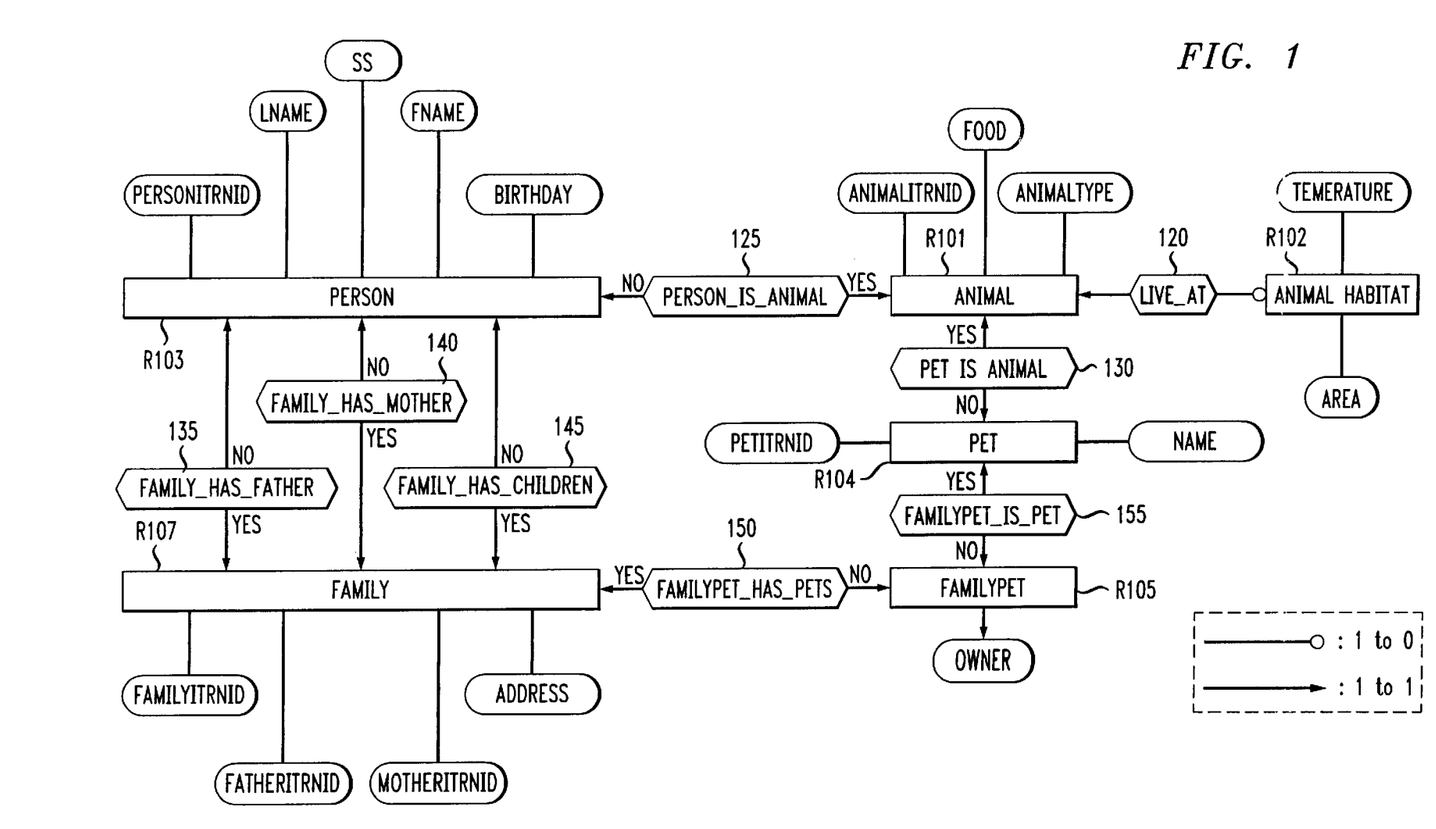
FIG. 1 is a block diagram of a relation diagram used to help explain the present invention.
Figure 2:
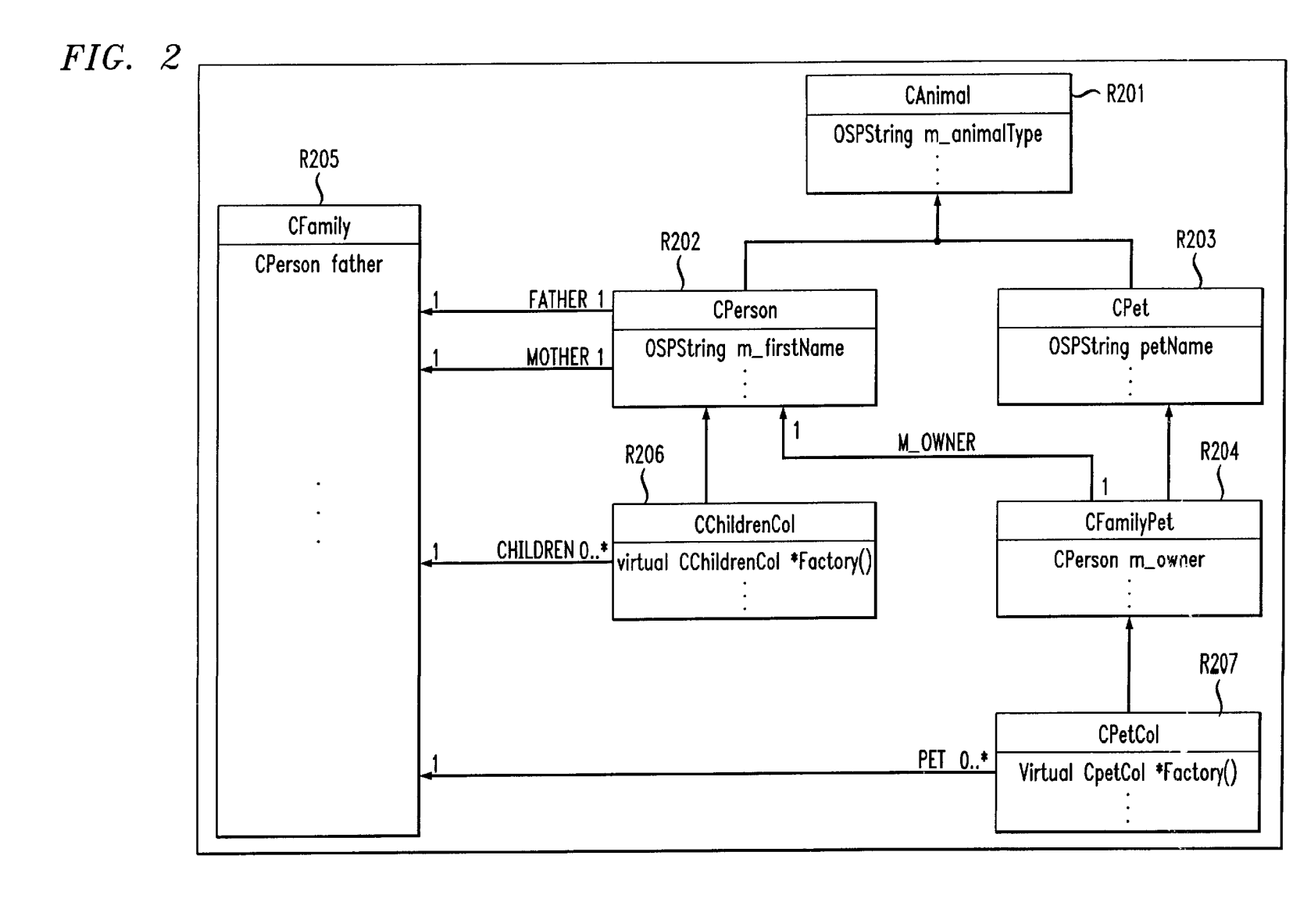
FIG. 2 is a block diagram of an object model used to help explain the present invention.

In "Principles of Database Systems", Computer Science Press, 1982, Jeffrey Ullman describes the concept of an entity relation diagram. FIG. 1 shows such an entity relation diagram for a database containing families. FIG. 2, by contrast, shows a possible object model (Family) to be mapped over the database schema of FIG. 1.

As shown in FIG. 1, the information about Animal is presented in two tables (R101, and R102). These two tables are related via a Primary-Foreign Key relation. As described above, the primary key uniquely identifies a row of attributes while a foreign key references another table's primary key. In this instance the Animal table includes records having the fields animalitrnid, animaltype and food. The Animal Habitat table includes records having fields locationid, area, temperature, animalitrnid. The relationship between these two tables is one-to-many (in our example). So, a given animal lives at certain area but that area may contain many animals. The relation statement 120 (Live_at) defines the relation between tables R101 and R102.

The Person table (R103) contains information about people, including records having the fields personitrnid, lname (last name), fname (first name), ss (social security), and birthday. Since a person is an animal, then the Person table is related to the Animal tables as indicated by relation statement 125.

Similarly, Pet table (R104), which represents all the pets and includes records having the fields petitrnid and name, is also related to the Animal (R101) table as all pets are also animals as indicated by relation statement 130. A family represented in the Family table (R107) is related to the Person table (R103) in three ways: once for the father, relation statement 135 (each father is a person); once for the mother, relation statement 140; and finally for children, relation statement 145. The relationship between family and father or family and mother is one-to-one. However, each family could have many children (one-to-many). The children table (R106) resolves the one-to-many relationship between the family and children. The representation of the data in the family and children tables is in third normal form. Each family could also have a number of pets. The Familypet table (R105) contains information about the relationship between the Family table (R107) and Pet table (R104) such as defining its owner. The relationship between these tables is indicated by relation statement 150. It also contains additional information about the pet such as its color. This representation (Family-FamilyPet) is not in the third normal form. The relationship between the Pet table R104 and the Family pet table R105 is indicated by relation statement 155.

Architecture

Figure 8:
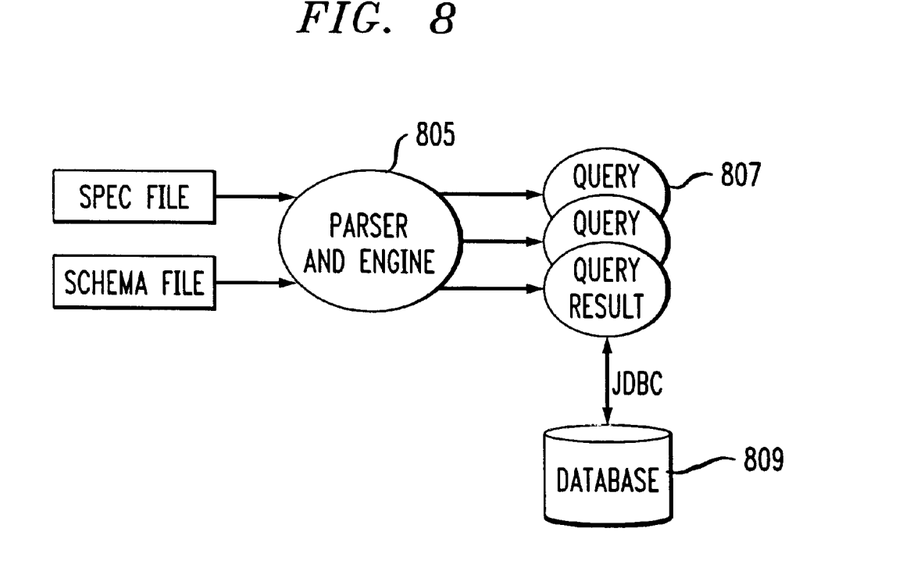
FIG. 8 is a block diagram of an architecture for employing an embodiment of the present invention.

The tool that forms the basis for an embodiment of the present invention is referred to as OSP Interactive also known as OSPI. This tool makes use of the information gathered by the OSP. OSP is a tool described in detail in the above-referenced patent application and hereby incorporated by reference with regard to its disclosure of how to map a database scheme onto an object model. The OSP data owner maps an object model over a database schema using a graphical user interface (GUI) provided by OSP. The information captured by the OSP GUI is represented in two files. More specifically, the information is represented in a specification file and a schema file. These two elements are shown in the block diagram of FIG. 8. The OSP schema file is not much different from the database schema file, however, it is extended to include some additional information. The spec file has all the information about the object model and its mapping to the database schema.

The OSPI parses these two files using Parser and Engine 805 to create a parse tree; this parse tree is used to construct a representation of the object model. This representation is described in further detail below with reference to FIG. 5. By clicking on an object to select that object, a representation of the selected object appears in the display. After a user constructs the query (by setting all the constraints, etc.) she submits the query 807 by pushing the Query button (not shown). This creates a new thread and passes all the information pertaining to the query to the new thread. The new thread passes the query to the database 809 through Java DataBase Connectivity ("JBDC") and gets the result (809) back, and represents the retrieved data graphically in the framework of the object model. The parse tree is used again to construct the query result representation. The reason for creating a new thread for each query is not to wait for the result of a submitted query before creating a new one. The program is all in JAVA and runs on a browser such as, for example, Netscape Navigator and Microsoft Internet Explorer).

Detailed Design

Turning to the design details of the architecture, lets look at details of specification file first. The specification file is written in OSP language, which is a very small Data Definition Language (DDL). It has a small set of keywords such as "Class", "Table", "FK", "PartOf", "IsA", etc. The language is described in greater detail in the co-pending application incorporated by reference above. The spec file is designed to represent the object model and its mapping to the database schema. For example, the CAnimal specification file is shown in FIG. 9.

Figure 9:
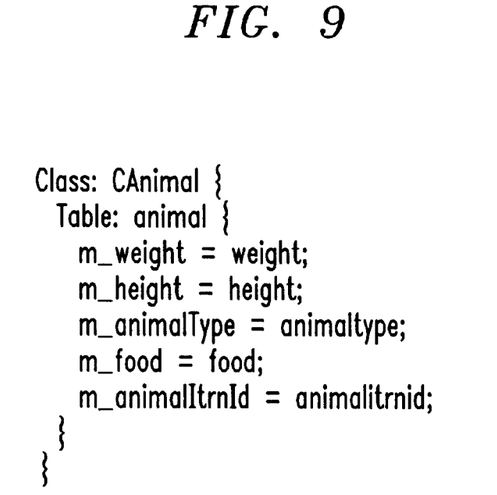
FIGS. 9 and 10 show specifications of elements used to explain an example that illustrates the usefulness of an embodiment of the present invention.

As it is shown in FIG. 9, the class CAnimal is residing on the table animal. Assignments (e.g. m_weight=weight) are indicative of a mapping between the object member variables and corresponding attributes in the table. For example, m_weight member variable is mapped to the attribute weight.

Figure 10:
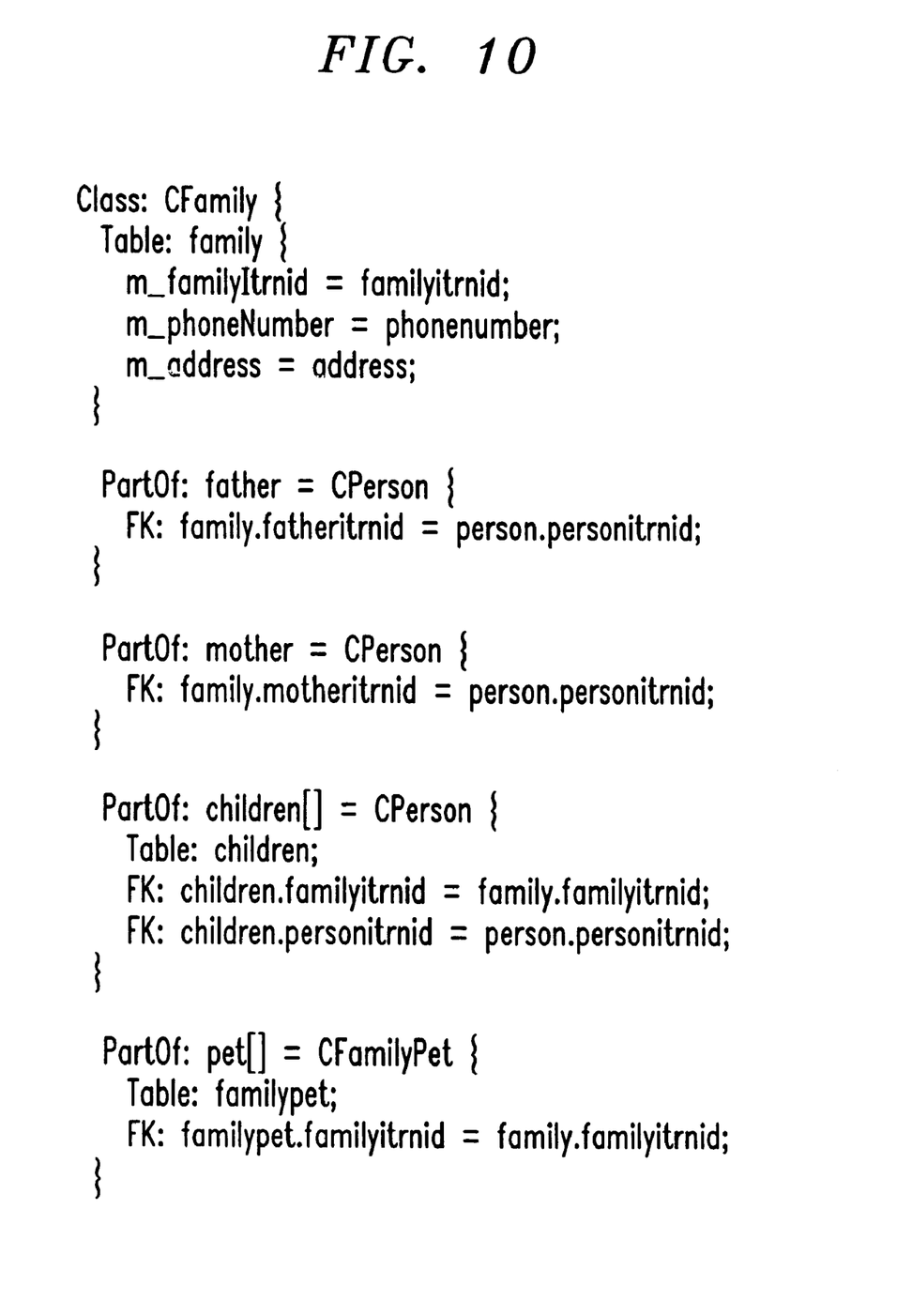

FIG. 10 shows a specification file for the CFamily. In this instance, the class CFamily rests on the Family table. The object assignments include m_family ItrnId=familyitrnid; mPhoneNumber=phonenumber; and m_address=address. The aggregation relationship (e.g., automobile) comprises body and engine objects are shown with the keyword PartOf. The aggregations generally come in two categories, scalars and collections. The open and closed bracket "[ ]" shows a collection aggregation. In the following example, children and pet are collection aggregations whereas the father and mother are scalar aggregations.

The variable following the PartOf keyword is the name of the aggregation (e.g., father). What comes after the "=" sign is the type of the variable (father is of type CPerson class as are mother and children, while pet is of type CFamilypet class). The FK keyword represents the primary and foreign key relationship of the two tables. The collection aggregation (there is a one-to-many relationship between the two objects) indicated by the open and closed brackets, might require an additional table to resolve the one-to-many relationship (in third normal form implementation). In the above example the children table is such a table. In this case two sets of primary and foreign keys are needed to illustrate the relationship among the tables.

Another relevant keyword is IsA (not shown in the figures). This keyword signifies an inheritance relationship between two objects. For example, the statement IsA: CAnimal;

in the specification for the CPerson class denotes the-derivation of a CPerson class from the CAnimal class. This relationship is shown in element 125 of FIG. 1. Similarly, IsA: CAnimal in the specification for the CPet class denotes the derivative of a CPet class from the CAnimal class. This relationship is shown in element 130 of FIG. 1.

There are a number of other keywords such as

Assoc: which denotes the association of one object to another.

AuxMethod: adds hooks to the generated code for a user supplied method.

InsertSP: denotes the user supplied Stored Procedure.

The schema file also has a major role in the tool of the present invention. The schema file represents the tables, each table's attributes, and each attribute's properties. Some of the relevant attribute properties are:

Size

Type (e.g. INTEGER or character)

Preferred OSP mapping—some attributes could be mapped to more than one OSP type. For instance, the attribute type NUMBER could be mapped to OSPFloat or OSPDouble.

Key information—whether the attribute is part of the primary or foreign key.

Unique groups—In the absence of the primary key, one or more groups of attributes can be used to identify a record uniquely.

The OSPI uses the information from these two files to construct a parse tree. This parse tree (an internal representation of the object model, database schema and the mapping information) is used to construct the query for each object. To create a query, first, all the tables involved in a query for a given object should be identified. This can be partitioned into three cases:

1. If an object maps to one table, then there will be only one table involved.

2. The object maps to more than one table via inheritance, aggregation, collection, and or multiple tables per object mapping. However, all the inherited or aggregated objects are distinct, in this case JOINing the tables will perform the task.

3. Same as case 2, but at least one of the objects (aggregated or inherited) is involved more than once. For instance, in the CFamily object, the father is of type CPerson, mother is of type CPerson, and children are of type CPerson. In this case the tables associated with the CPerson (which includes the tables associated with CAnimal since CPerson is derived from CAnimal) should be joined once for the mother, once for the father and once for the children if we have a query such as List all the families with the father's name "John", mother's name "Sue" and a child name "Jack".

Now, in this circumstance, the tables Person, Animal and AnimalHabitat should be a part of the JOIN three times each, once for corresponding father, once for the mother, and once for the children object. In order to reference the correct table (one out of three) we have to assign an alias name to each table. So, the Person table associated with the father object could be called (alias name) "person-f", the one corresponding with mother could be called "person-m" and finally the one mapped to the children could be named "person-c". Similarly, the Animal table associated with the father object could be called animal-f, the one corresponding to the mother cold be called mother-m and so on.

After all the tables are identified and named properly, the connections among the tables should be established. This is to construct the query's where clause (described in the Ullman reference). The information about the primary and foreign keys of tables makes this task feasible. Care must be taken to refer to the tables with their alias names, and to connect them appropriately. For instance, there should be a connection between the Person and Animal table, but in the CFamily, the person-f and animal-f tables should be connected for the father object.

After including the object model mandated connections among the tables, the user constraints (e.g., mother's first name is "Janet") should be considered. Again the constraints are in terms of member variables and they should be translated to the attributes and tables (in particular the alias tables).

When the query is built, a new thread is created and the query is passed to the new thread. If the query involved more than one object, for each object a query is generated as described above. However, the result of the query goes to a temporary table, which is created with all the attributes in the projection list of the query. The result of the query is inserted into the query's corresponding temporary table. Finally, a terminal query is generated against the temporary tables. This last query resolves the drag and drop constraints. For example, in the query List pair of families with the same father's name (first name) and mother's name "Sue".

The first query gets all the families with mother's name "Sue", and puts it in a temporary table TempTable1. Since the constraint (mother's name="Sue") applies to the second family, the second query performs the same query and puts the result into TempTable2. The final query runs against the TempTable1 and TempTable2 in which the father's first name in the TempTable1 is the same as the father's first name in TempTable2. There is an obvious optimization that can be applied in the above example, there is no need to run the second query, because it is identical to the first one and in the last query TempTable1 has to be joined with itself with a proper alias name.

EXAMPLE

Having described the details of the architecture of OSPI an example is now presented which illustrates how this tool functions as well as the advantages to be gleaned from its use.

The following is an object model that is mapped to the database schema. The class CAnimal (R201) (the prefix C is CAnimal denotes the type class, hence the class Animal) resides over two tables Animal (R101) and AnimalHabitat (R102) of FIG. 1. The CPerson (R202) class maps to the person table, CPet (R203) class resides over the pet table. Both the CPerson and CPet classes inherit from the CAnimal (R201) Class. The CFamily (R205) class maps over the family table, and contains a father, a mother which are both type CPerson, and a children member, which is of the CChildren Collection of (R206) CPerson type. The children table is used to resolve the one-to-many relationship between the family table and person table. The CFamilyPet class resides over the FamilyPet table and inherits from the CPet class (an object of type CFamilyPet class has all the characteristics of a CPet class compounded with a few of its own). A CFamily object also contains a CPet Collection (R207) of CFamilyPet Objects.

Figure 3:
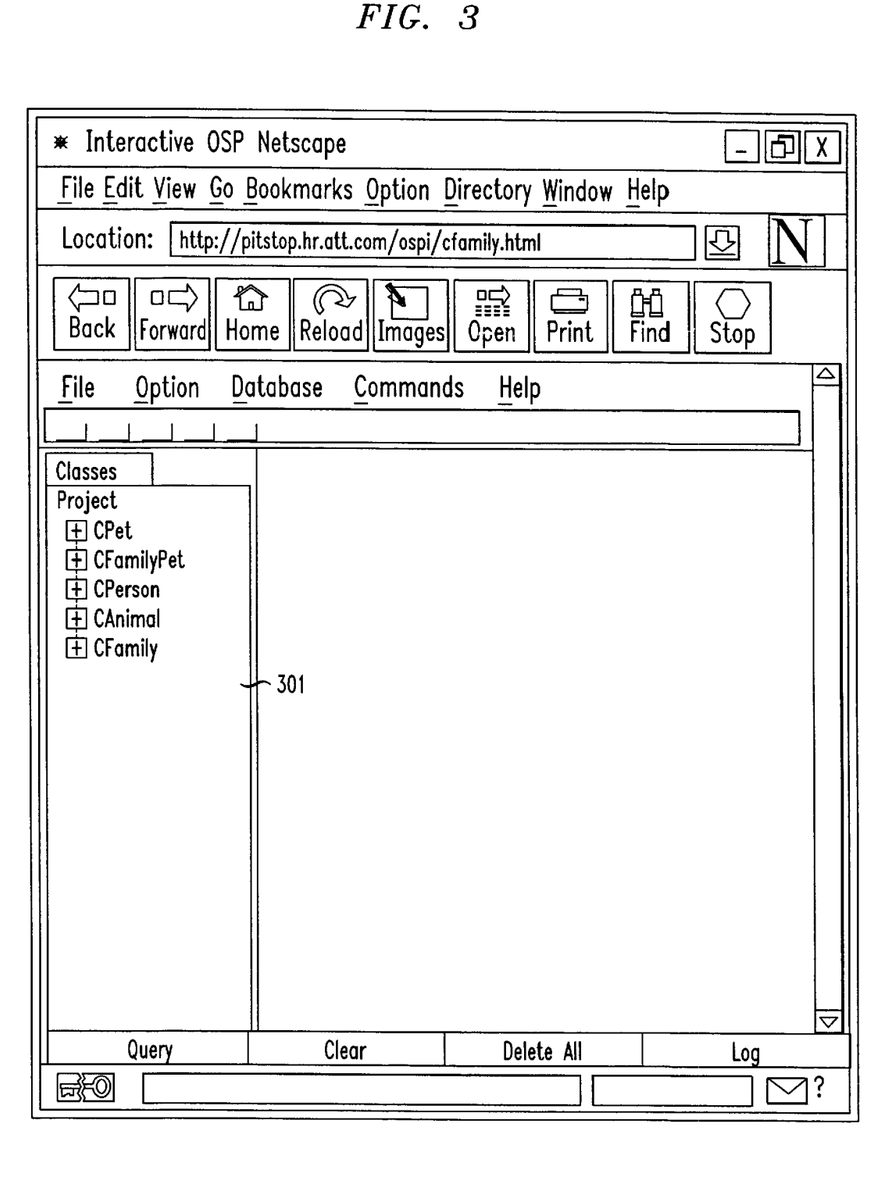
FIGS. 3 to 7 show examples of graphical user interfaces presenting information in accordance with an embodiment of the present invention.

FIG. 3 illustrates a display screen presented to an OSPI user in accordance with an embodiment of the present invention.

The OPSI first presents a list of all the objects on the object model as it is shown in the left box 301 FIG. 3. A list of Classes (CPet, CFamily Pet, CPerson, CAnimal, CFamily) are presented as objects.

To get the detail of, for instance, the CFamily object, the user "clicks on" or selects the CFamily text or the "+" next to it.

Figure 4:
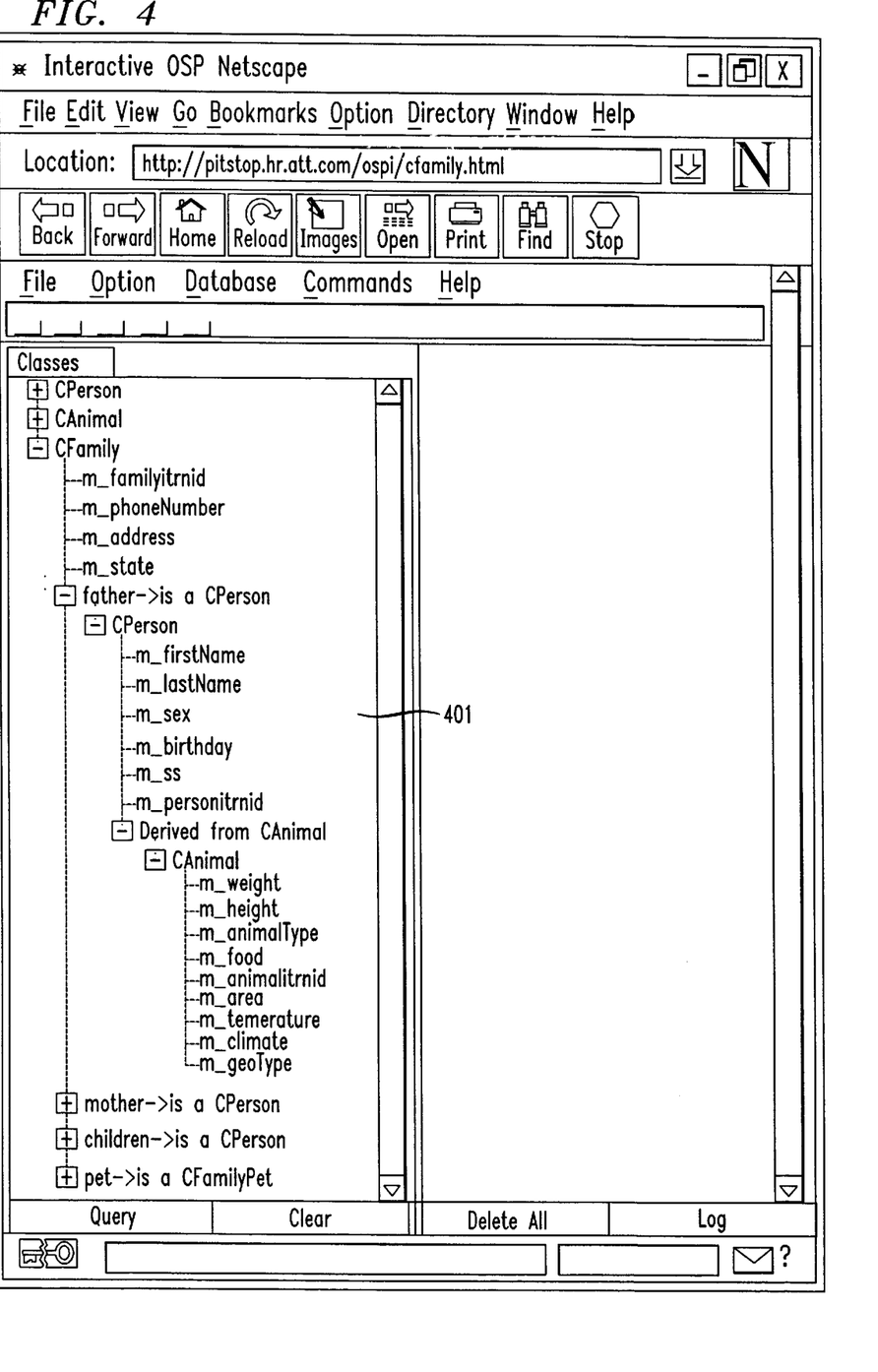

The CFamily object is then expanded and exposes its content as illustrated in the left box 401 of the display screen illustrated in FIG. 4. The content includes a listing of the family table attributes, e.g., familyitrnid, etc. as well as Father of class CPerson Mother of class CPerson Children of class CPerson (Collection, notice the brackets)

Pet of class CPet

"Clicking on" the Father exposes the CPerson class, and its inheritance (CAnimal).

So, given the above representation, the information in the database is presented to a casual and non-programmer user in an intuitive and non-technical form. The user does not have to trace the primary and foreign keys, or get the detail of the database schema to get a representation of the data.

Queries can be performed on a single object, or on multiple objects.

To perform a query on a single object, the user further selects or "clicks on" the desired object (CFamily). A representation of the CFamily object appears on the right window or box 502 in FIG. 5. The user can set any constraint on any member of the CFamily object by clicking on the member and typing the constraint in the text field.

Consider the following query:

List all the families with mother's first name "Janet" and father's first name "Robert".

This can be accomplished by

Figure 5:
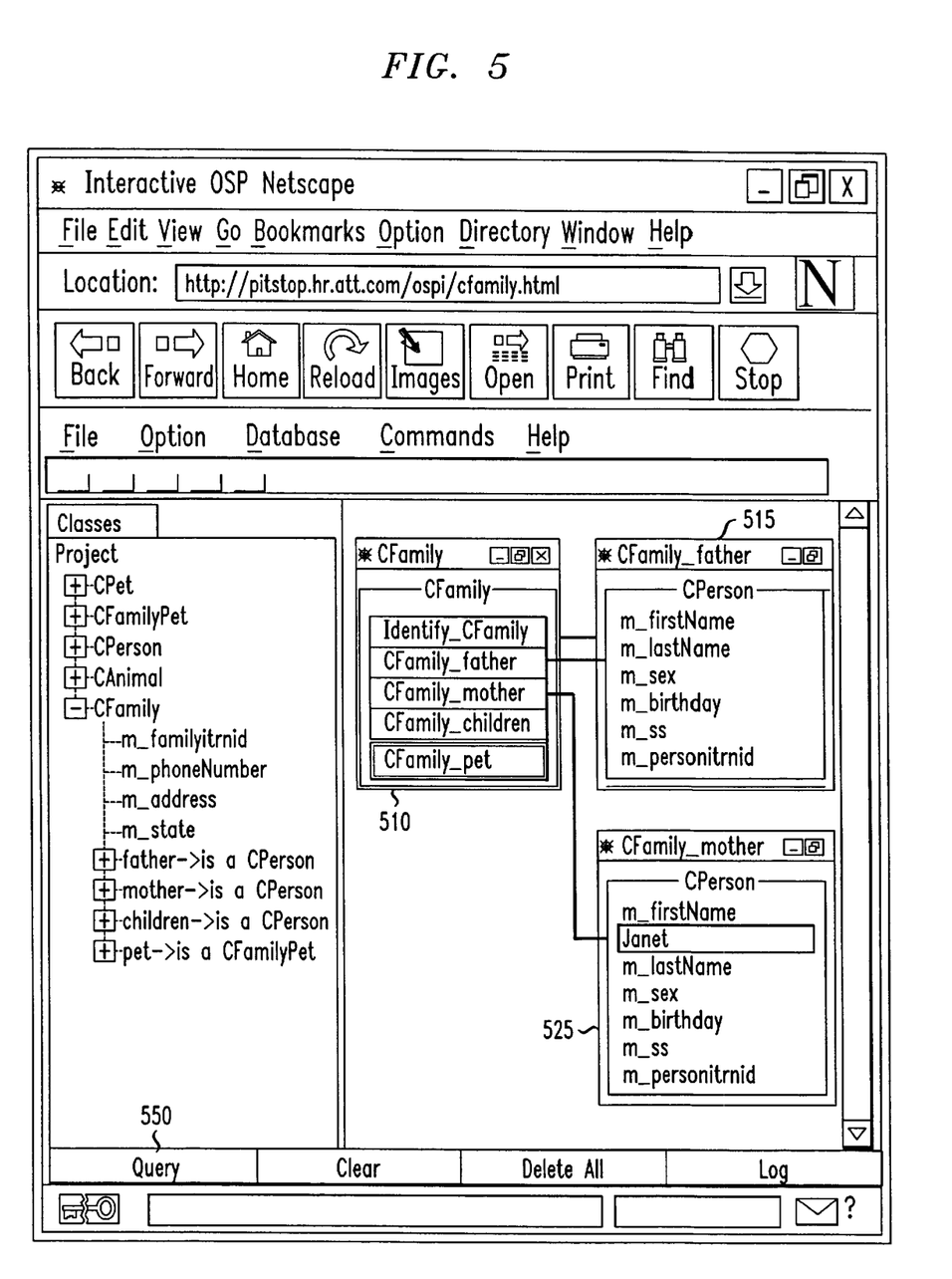

1. Clicking on the father component of the CFamily (CFamily father) 510 to expand it. The attributes are shown in the window CFamily father/CPerson, 515.

2. Click on the firstName member (m_firstname), and type in "Robert".

3. Click on the mother component (CFamily mother) 520. The attributes are shown in the window CFamily mother/CPerson, 525.

4. Click on the firstName member (m_firstname), and type in "Janet".

5. Click on the Query button 550.

For security reasons the user may be prompted to supply a login and password to the database before any query is being processed.

Figure 6:
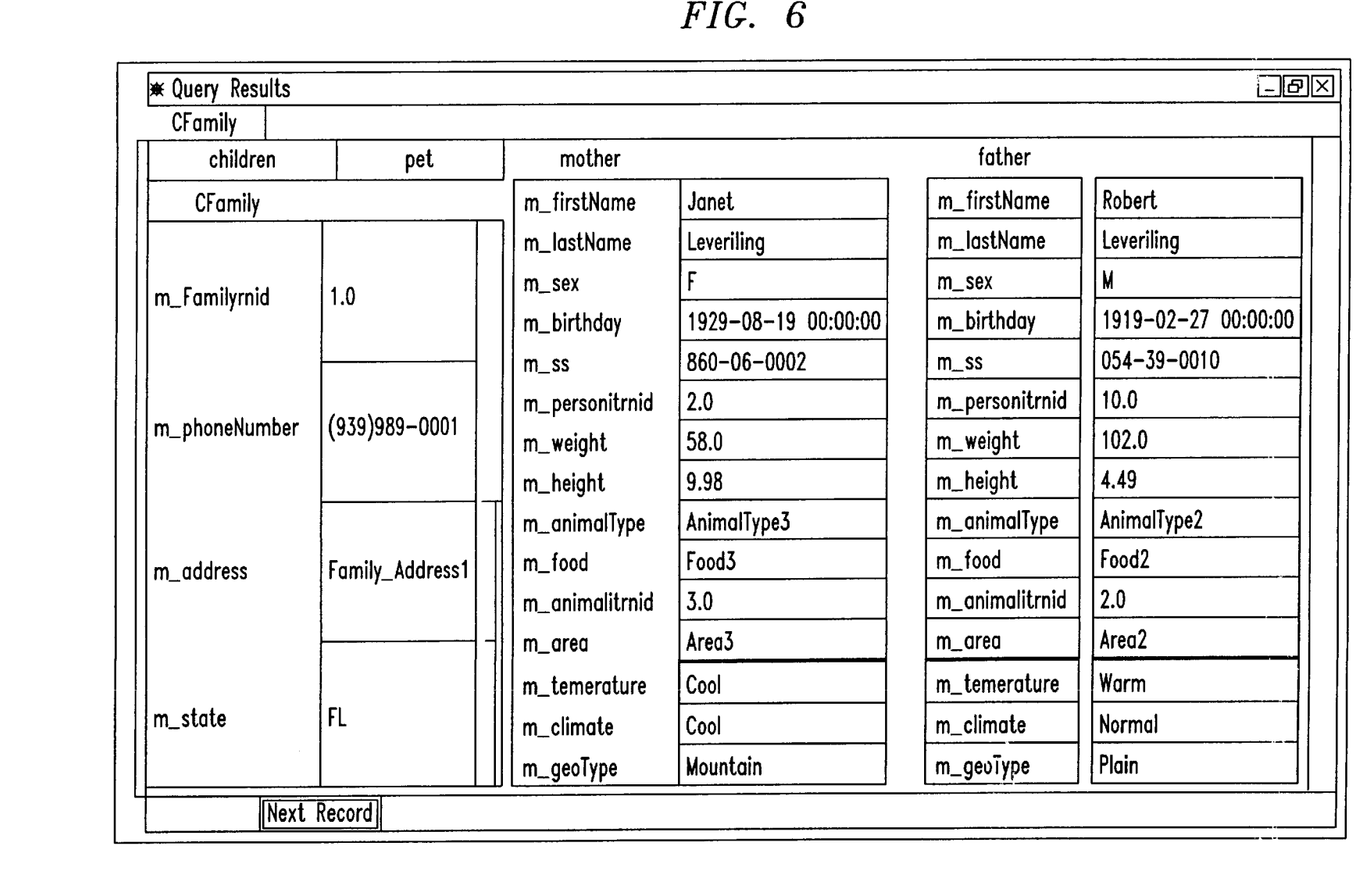

FIG. 6 shows the result of the query, that is, all of the families with mother's first name Janet and father's first name Robert. The query result maps directly into the object model. These families may include children and/or pets. Sincepet and children are collections, their data is revealed one at a time when the user clicks on them. This is to avoid the potential confusion when there is collection within a collection. In this case, it is easier to associate the collections to an object when we are referencing them one at a time. For instance, if each child in a collection of children has their own collection of favorite books, the association of books to a child is easier to visualize when children are shown one at a time with a button labeled favorite Books, where clicking on that button, reveals the books.

Queries can also be made over multiple objects, related or otherwise. Consider the following query:

List pair of families with the same father's name (first name).

Figure 7:
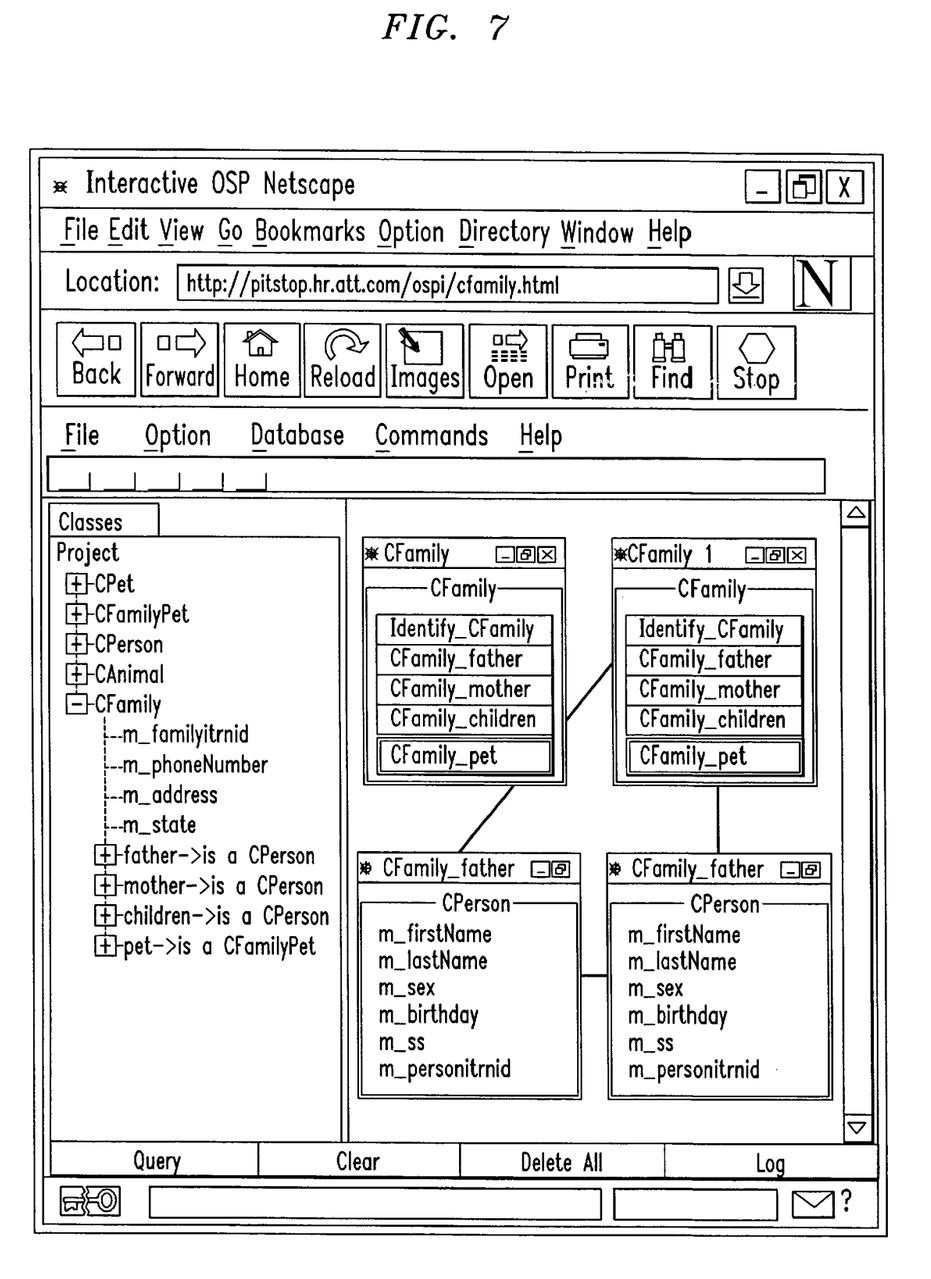

The above query can be performed by instantiating (clicking) the CFamily object twice. Expanding the father object on both, and drag the m_firstName from one father and drop it to another one and click the Query button as illustrated in FIG. 7.

Conclusion

The present invention takes advantage of the mapping performed by the OSP tool to present an easily understood description of the relationship between elements in a relational database. Furthermore, this new tool, OSPI, permits casual users to generate queries for complex databases.

What is claimed is:

1. A method of facilitating user operations on a relational database, comprising:

mapping an object model onto a database schema;

presenting the object model in a graphical user interface;

responsive to selections of presented objects, modifying said display to prompt a user to set an object constraint; and generating a query using said constraint.

2. The method of claim 1 further comprising:

generating a web page based on the results of mapping said object model onto said database schema; and said step of presenting includes providing said generated web page to a user.

3. The method of claim 1 wherein said step of presenting includes delineating in said graphical user graphical user interface, a plurality of objects and relationships between the objects in said plurality of objects.

4. A method for presenting relational database information, comprising:

parsing an object model specification file and a database schema file to create a parse tree;

constructing a graphical representation of an object model using said parse tree;

transmitting said graphical representation to a user for display on a graphical user interface.

5. The method of claim 4 wherein said step of constructing comprises generating a web page representation of a plurality of objects and relationships among objects in said plurality.

6. The method of claim 5 further comprising:

receiving an object model selection;

presenting a list of objects corresponding to the selected object model;

receiving a selection of an object selected from said list of objects; and transmitting constraint parameter information in response to said selection of an object.

* * * * *

UNITED STATES PATENT AND TRADEMARK OFFICE
CERTIFICATE OF CORRECTION

PATENT NO. : 6,490,581 B1  
DATED : December 3, 2002  
INVENTOR(S) : Shapour Neshatfar and Pramo Warty It is certified that error appears in the above-identified patent and that said Letters Patent is hereby corrected as shown below:

<u>Title page,</u>  
Item [57], ABSTRACT,  
Line 6, insert the word -- to -- before the word "perform" in the second sentence.

<u>Column 9,</u>  
Line 29, change "display" to -- graphical user interface --

<u>Column 10,</u>  
Line 4, delete the second occurrence of "graphical user".

Signed and Sealed this

Twentieth Day of May, 2003

JAMES E. ROGAN  
*Director of the United States Patent and Trademark Office*